(12) United States Patent
Kovacevic

(10) Patent No.: US 9,819,374 B2
(45) Date of Patent: Nov. 14, 2017

(54) ADVANCED DEVICE LOCKING CRITERIA

(71) Applicant: T-Mobile USA, Inc., Bellevue, WA (US)

(72) Inventor: Amela Kovacevic, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/084,967

(22) Filed: Mar. 30, 2016

(65) Prior Publication Data

US 2017/0288719 A1    Oct. 5, 2017

(51) Int. Cl.
*H04B 1/3818*    (2015.01)
*H04W 8/18*    (2009.01)

(52) U.S. Cl.
CPC .......... *H04B 1/3818* (2015.01); *H04W 8/183* (2013.01)

(58) Field of Classification Search
CPC .............................. H04B 1/3818; H04W 8/183
See application file for complete search history.

(56) References Cited

U.S. PATENT DOCUMENTS

| | | |
|---|---|---|
| 2007/0129078 A1 | 6/2007 | De Beer |
| 2008/0003980 A1 | 1/2008 | Voss et al. |
| 2008/0005577 A1 | 1/2008 | Rager et al. |
| 2008/0090614 A1 | 4/2008 | Sicher et al. |
| 2008/0107269 A1 | 5/2008 | Gehrmann et al. |
| 2010/0095364 A1 | 4/2010 | Norgaard et al. |
| 2010/0299748 A1 | 11/2010 | Johansson et al. |
| 2012/0077496 A1 | 3/2012 | Mathias et al. |
| 2013/0109352 A1 | 5/2013 | Obaidi |
| 2015/0126153 A1 | 5/2015 | Spitz et al. |
| 2016/0037344 A1 | 2/2016 | Kim et al. |
| 2016/0277439 A1 | 9/2016 | Rotter et al. |

OTHER PUBLICATIONS

Office Action for U.S. Appl. No. 15/084,853, dated Nov. 23, 2016, Kovacevic, "Secure Adaptive Device Locking", 11 Pages.
The PCT Search Report and Written Opinion dated Jun. 22, 2017 for PCT application No. PCT/US2017/023540, 11 pages.
PCT Search Report and Written Opinion dated Jun. 27, 2017 for PCT Application No. PCT/US17/23552, 14 pages.

*Primary Examiner* — Joseph Dean, Jr.
(74) *Attorney, Agent, or Firm* — Lee & Hayes, PLLC

(57) ABSTRACT

Systems and methods for providing additional control over user equipment (UE) using standardized features of a subscriber identity module (SIM) is provided. The UE can impose SIMLocking criteria based on subscriber related attributes (such as rate plan, prepay, postpay, etc.). The SIM module can comprise multiple unique entries and one value for each entry. One or more entries on the SIM can be subdivided to provide additional values with each value made up of a subset of bits from a particular entry. Thus, a single entry can provide a plurality of values to make up a SIM configuration. The SIM configuration can be compared to a UE SIMLock configuration with the same, or similar, entries to determine if the SIM is compatible for use with the UE. The SIM configuration can be updated dynamically to reflect changes in the account associated with the UE or the SIM.

16 Claims, 12 Drawing Sheets

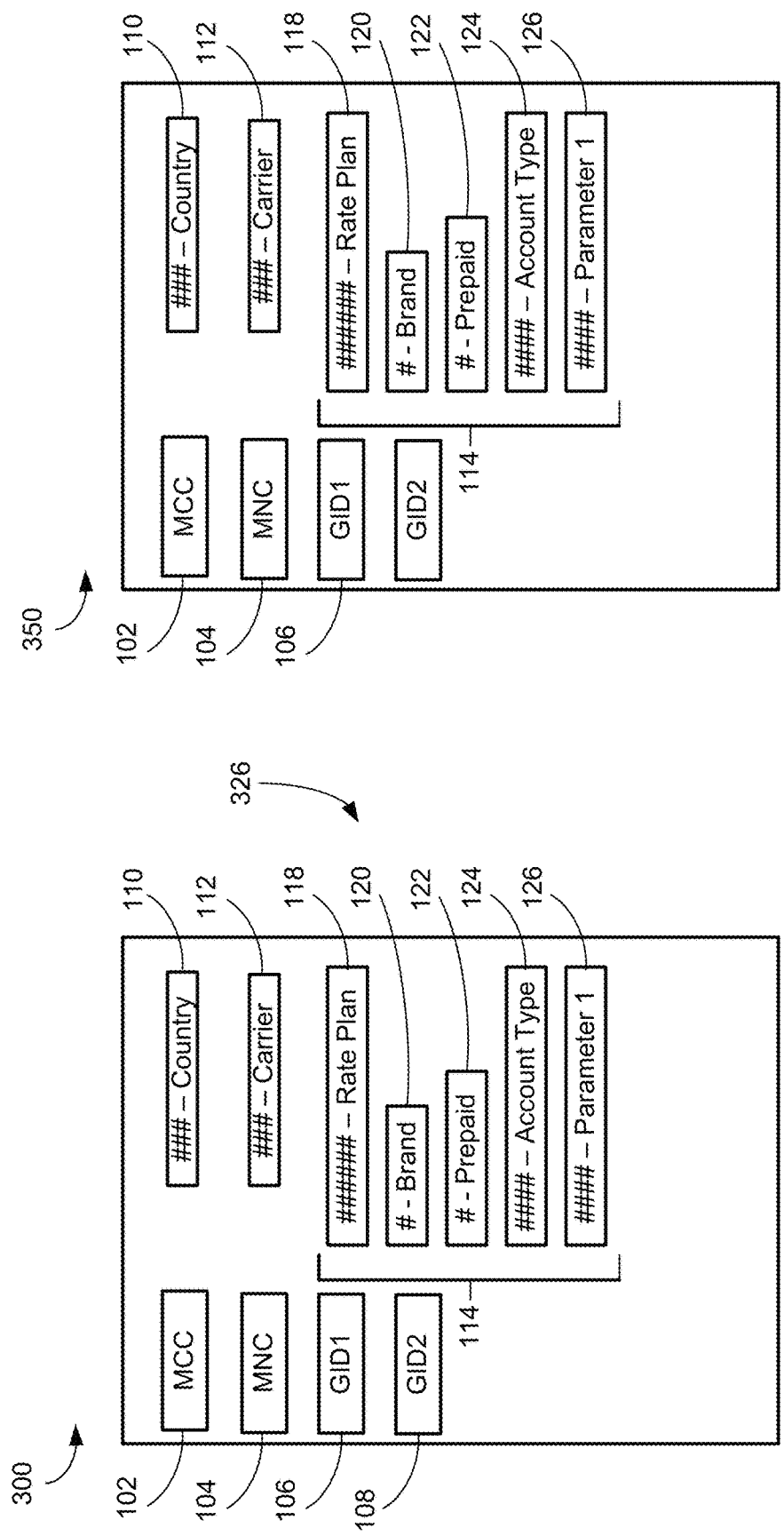

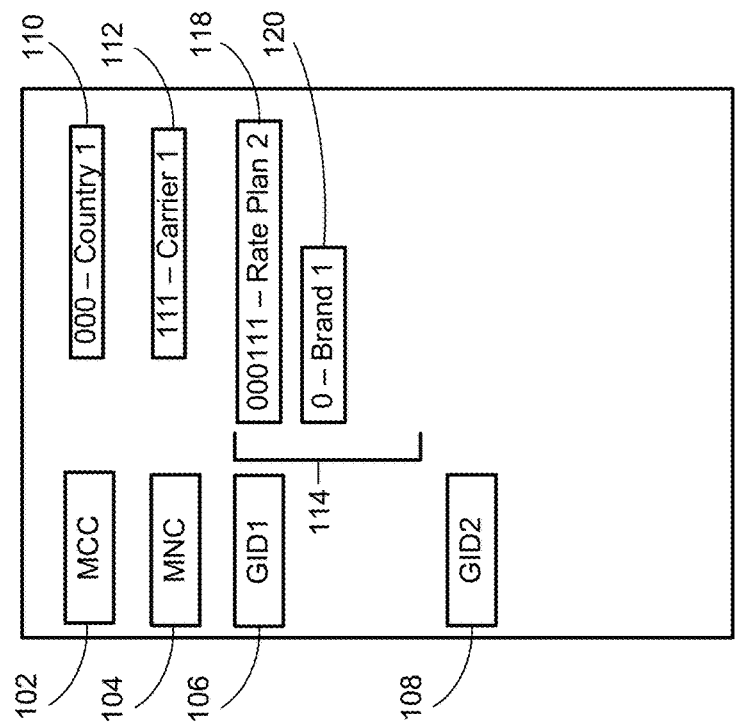
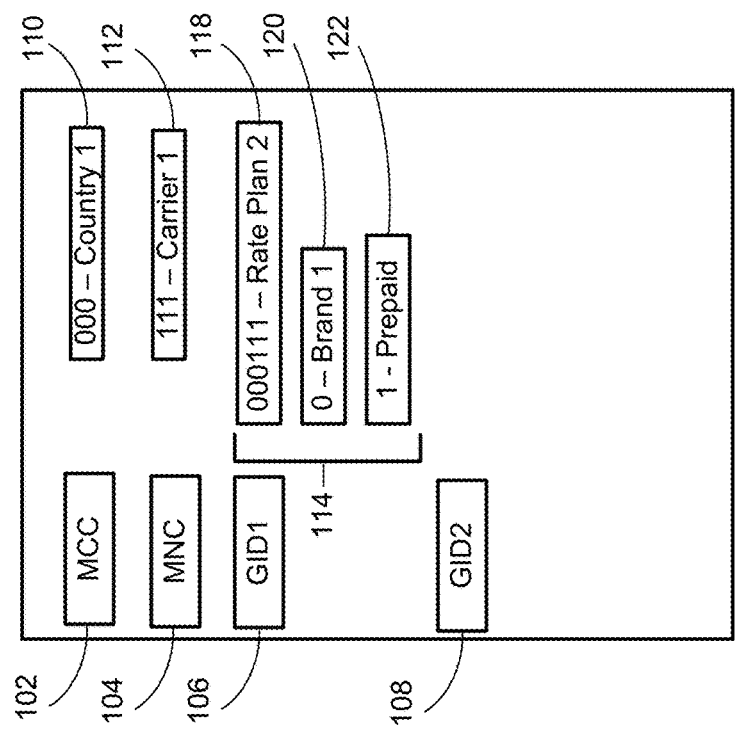
FIG. 4B

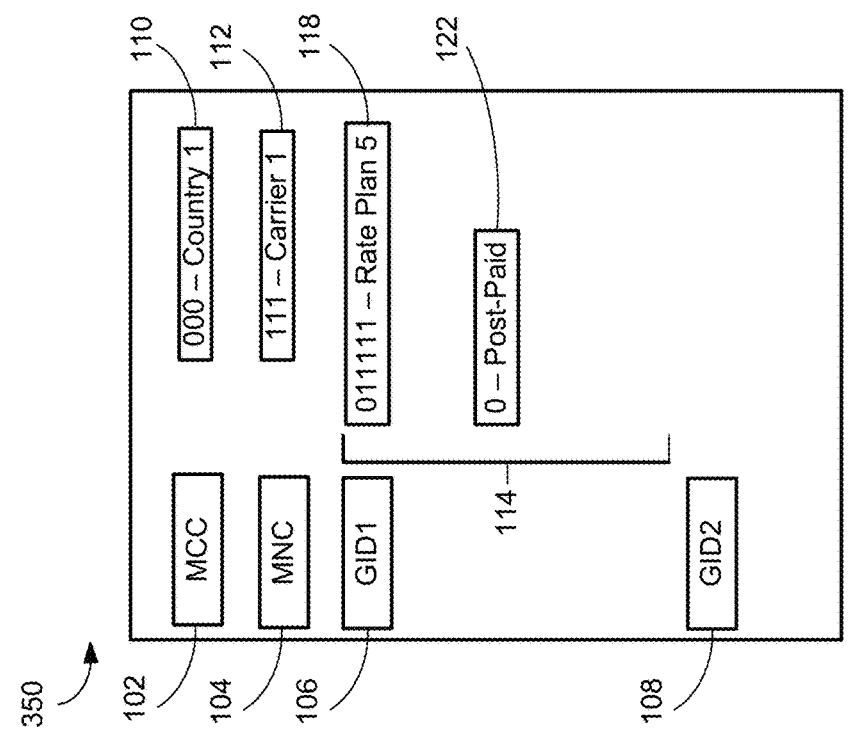
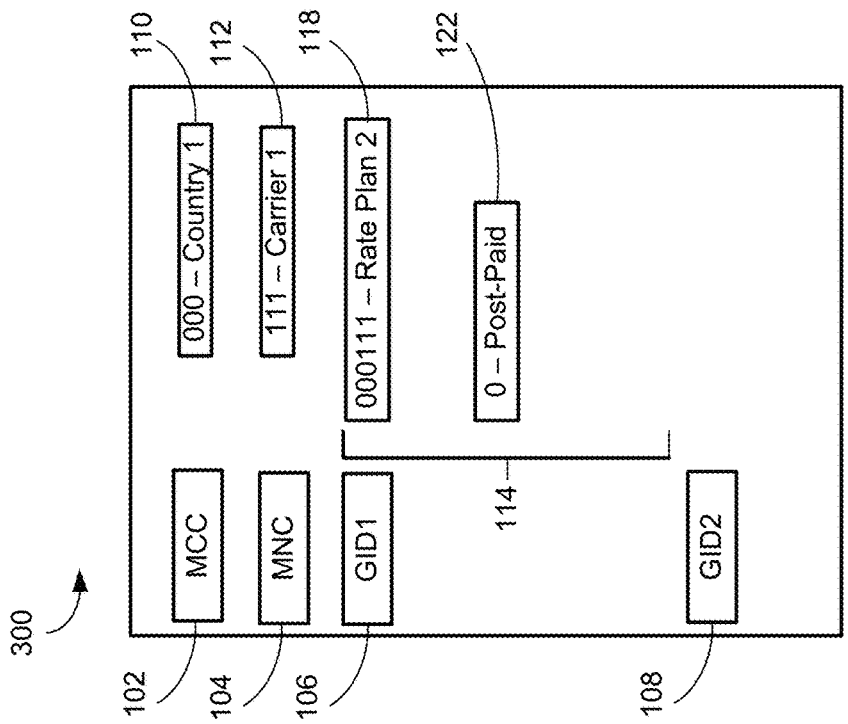
FIG. 4D

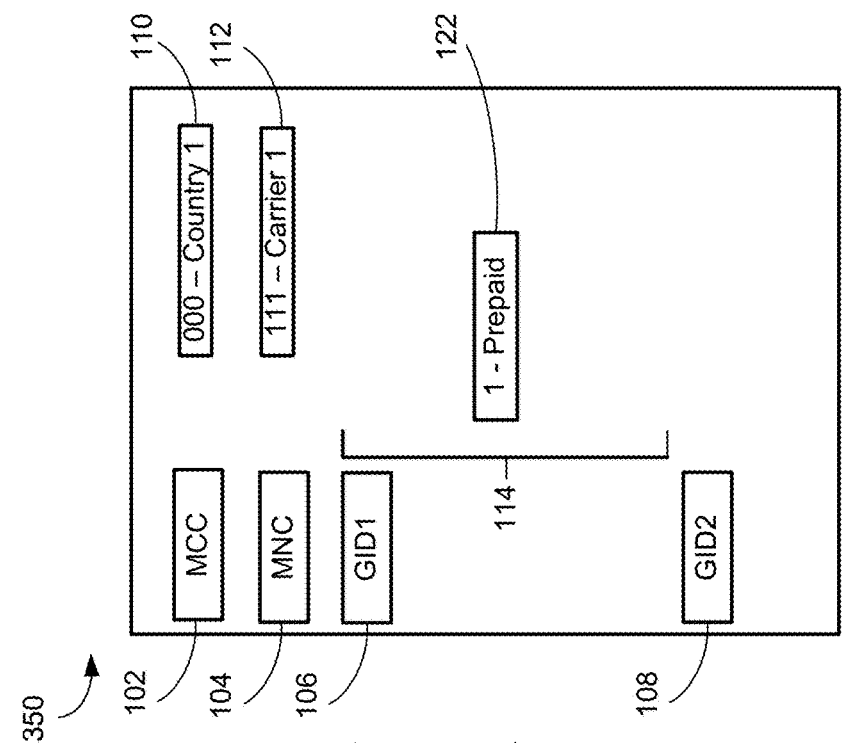
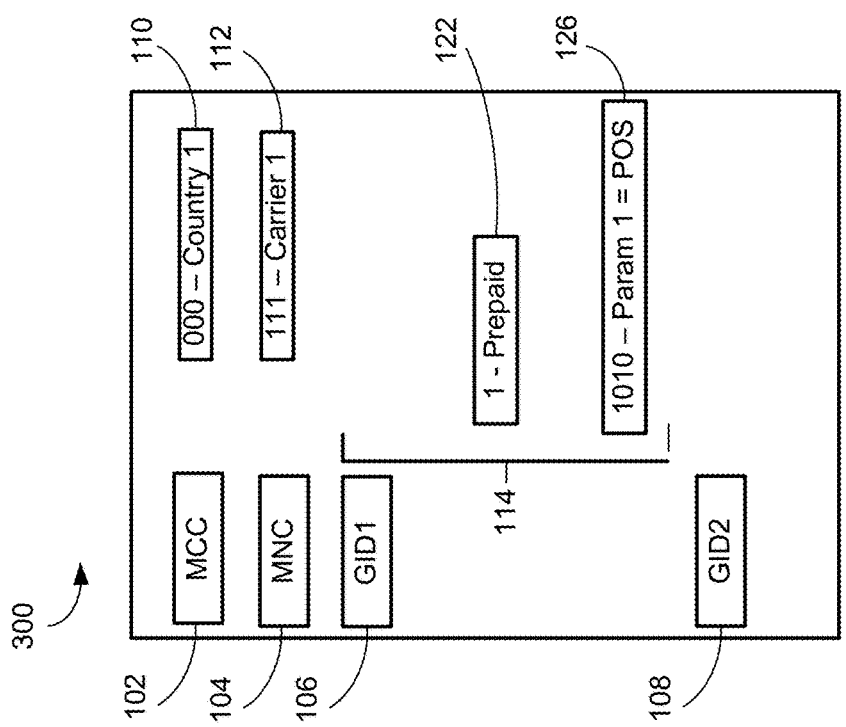
FIG. 4F

ADVANCED DEVICE LOCKING CRITERIA

BACKGROUND

Smart phones and other cellular devices are ubiquitous. People use these devices for both business and personal use. Many cellular devices include both voice call capabilities and data capabilities such as, for example, web browsing and e-mail. These services are generally billed to consumers in plans that may include a predetermined number of minutes, megabytes (MB) or gigabytes (GB) of data, and/or short messaging service (SMS, or text) messages.

Cellular devices can also be billed on a pre-pay or post-pay basis. As the name implies, pre-pay billing requires that the user buy a block of minutes and/or data in advance. When all (or nearly all) of the minutes or data is used, the user must purchase additional minutes and/or data. In some cases, the user may receive a text message or other notification that he is almost out of minutes and/or data. Post-pay customers, on the other hand, are billed for the minutes and/or data used during consecutive billing periods.

In existing solutions, a user's equipment (UE) and subscriber identity module (SIM) are not aware of any mobile subscriber attributes such as "prepaid" or "postpaid", or "rate plan". Current configurations are limited to, at most, the country mode (MCC) and network code (MNC) for a particular UE, which are related to the carrier for the UE not the subscriber. This makes it impossible to enforce any additional SIM locking rules based on subscriber specific attributes. In addition, any changes made on the billing side (such as switching account from prepaid to postpaid), for example, are not propagated down to the UE/SIM level; and thus, no control over these attributes is provided.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 3A and 3B illustrate a UE SIMLock configuration and a SIM configuration, respectively, in accordance with some examples of the present disclosure.

FIGS. 4A-4F depict the comparison of various configurations of the UE SIMLock configuration with various configurations of the SIM configuration to determine compatibility.

DETAILED DESCRIPTION

Figure 1:
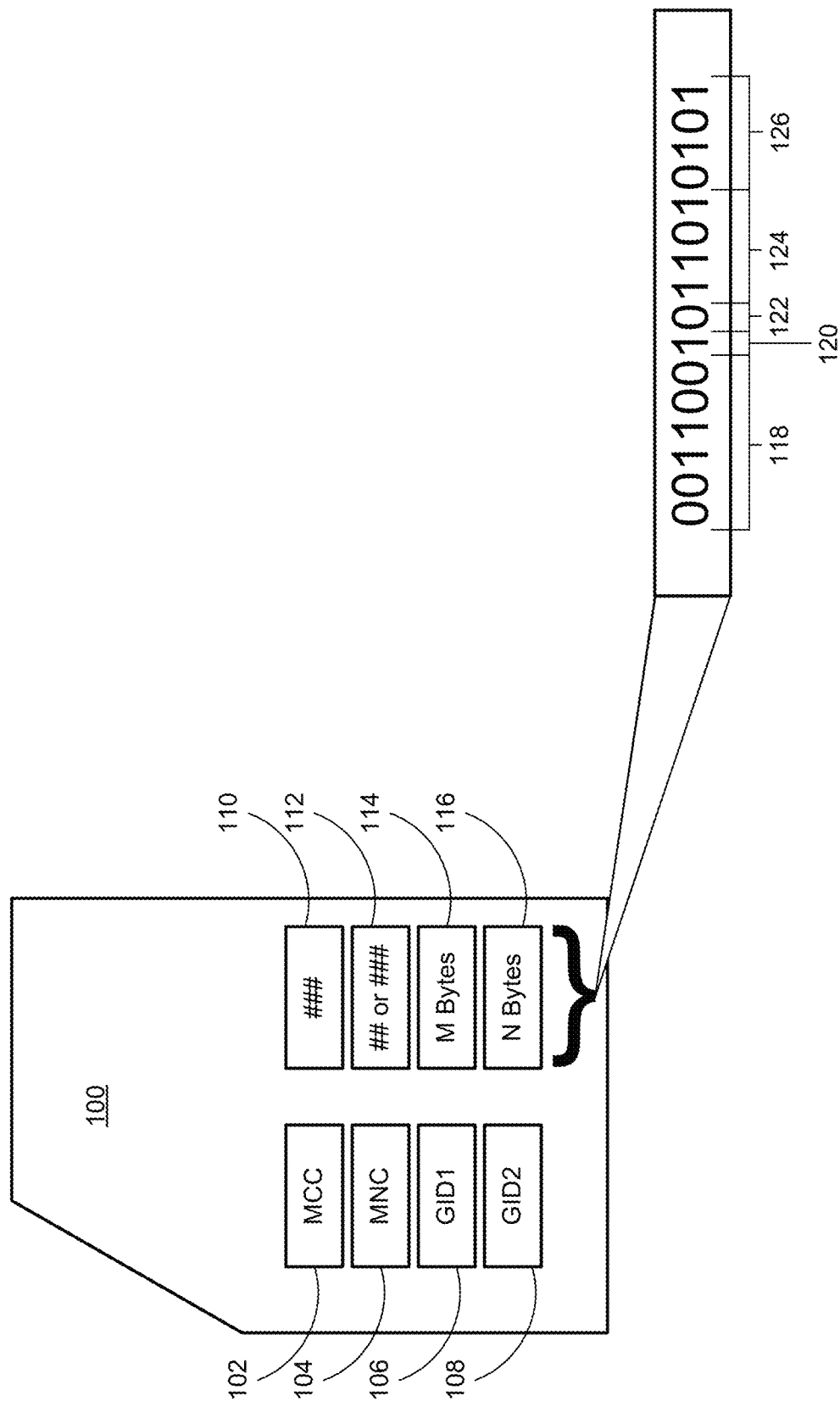
FIG. 1 depicts a subscriber identity module (SIM) comprising an improved data structure, in accordance with some examples of the present disclosure.

This disclosure describes, in part, a telecommunications system configured to provide additional features and control to user's equipment (UEs) using existing third generation partnership project (3GPP) data fields. The UEs can include the ability to parse current data fields provided by an installed subscriber identity module (SIM) to provide additional functionality. The UE can then take a number of actions based on whether the SIM (1) does not contain a value for a particular field or (2) contains a compatible value for that field or (3) contains an incompatible value for that field. The SIM can be updated dynamically using a SIM over-the-air (OTA) platform, or other means, and a subscriber attributes update server to reflect changes in the user's account, among other things.

The system is described herein with reference to a cellular network and UE. One of skill in the art will recognize, however, that the system is equally applicable to other types of networks such as, for example, Wi-Fi, cable or satellite TV networks, or other networks with billing based on usage. In addition, the term UE used herein can include cellular and smart phones, tablet and laptop computers, games, and other network enabled electronic equipment. The terms "user" and "subscriber" are used interchangeably to denote the user of a UE, as opposed to the carrier, for examples.

A problem with conventional UE SIMLock configurations and SIMs is that they provide very little information and control. Many UEs provide no control at all (so-called "unlocked" phones), while others are only restricted to use on a particular network ("network locked" phones). As a result, these UEs do not prevent users from switching between carriers (unlocked) or switching plans with the same carrier (network locked). This can result in substantial costs for a carrier when a user takes a heavily subsidized UE to another provider or switches to a low cost plan, for example, preventing the original carrier from recovering any phone subsidy.

UEs are generally sold as a "package" with call and data plans being sold along with the UE. In other words, the cost of a UE is often heavily subsidized by the wireless carrier in exchange for a one- or two-year contract at a particular rate. UEs are also sold with prepaid plans that place the carrier at additional risk. In other words, prepaid UEs are often sold at a substantial discount because the prepaid market is extremely competitive and cost-sensitive. As a result, the carrier may not fully recover the initial cost of a UE until the user buys a certain number of additional minutes. To add to this risk—in contrast with postpaid customers where the carrier has the user's name, address, and other information—prepaid UEs are often sold anonymously.

In either case (prepaid or postpaid), while the UEs are sold at a substantial discount, the carrier often anticipates recovery of this cost over the life of the contract (postpaid) or based on a predetermined number of minute purchases (prepaid). Carriers may offer UE's for less than $200 (or even free) in conjunction with a new, or renewal, two-year contract or a large initial minute purchase (e.g., 1000 minutes). In contrast, "unlocked" UEs, or UEs sold without any restrictions on their use or any contract or minute requirements, can often cost $600-700, or more.

As a result, UEs are often sold at different prices based on the call and data plan chosen by the user. If a user chooses a more expensive unlimited plan at $100/month, for example, the UE may be provided to the user at low, or even no, cost. A user who chooses a $20/month plan, on the other hand, will receive a respectively smaller discount or a longer contract term. In addition, UEs may be sold at different discounts based on other factors such as, for example, which retailer is selling the UE or whether the UE is sold with a prepaid plan or a postpaid plan. Users on prepaid plans, for example, may receive additional discounts simply because they tend to be more cost sensitive.

A problem occurs, however, when a user purchases a UE with a discount based on one billing plan, for example, but then changes to another billing plan. As mentioned above, a user may receive a phone at no cost because they have initially agreed to purchase an unlimited calling and data plan for $100/month for two years. If the user then changes his plan to a $20/month plan one month into his contract, the carrier will likely not recover the cost of the UE and may lose money. Similarly, a user may receive a UE at a deep discount on a prepaid plan and then switch to a postpaid plan. In this case, the carrier has both (1) provided a deep discount and (2) now shoulders the risk that the user will pay their bill.

Using current technology, a user can affect changes on their billing plan using various methods. The user may be able to access an online account interface to change plan parameters. The user may also be able to go to the carrier, or a different carrier, and buy a SIM separately. Many conventional UEs are either completely unlocked—i.e., they can be used on any network, plan, or billing type—or locked only with respect to a particular carrier—i.e., they can be used on any type of account with a particular carrier. Using current technology, therefore, there is no process by which UE can be linked to a billing type (e.g., post-pay vs. pre-pay), data plan, brand, or other specific parameters.

In the unlocked configuration, for example, there is nothing to prevent a user from switching carriers by simply changing the SIM. Thus, the user may have received the UE from a first carrier at a deep discount, but then switched to a second, discount carrier with a cheaper rate plan. The second carrier may be able to offer cheaper rate plans because they do not offer UEs or do not offer discounts on UEs and thus, do not have to recover the initial investment.

In the carrier locked configuration (e.g., only "mobile network carrier," or MNC is configured), the user may nonetheless switch between prepaid and postpaid plans with the same carrier, for example, because the user is currently not identified as one or the other (i.e., pre-pay or post-pay). The user may also be able to switch between brands within the same carrier—i.e., the carrier may have a full-service brand and a discount brand on the same network. The user may also switch from a higher priced plan to a lower priced plan, or vice-versa.

Thus, the user may purchase a UE at a discount from a low-cost retailer on a prepaid plan, for example. The user can then purchase a postpaid SIM for the same carrier on a different plan and install it in the UE. Because the SIM is registered to the same carrier, the SIM and the UE "match." Thus, the user has "moved sideways" from a prepaid account to a postpaid account to the carrier's detriment and without the carrier's knowledge, control, or consent.

To this end, examples of the present disclosure can comprise systems and methods for increasing the functionality and control of UEs. The system can better utilize existing entries on the SIM in a new way to provide additional granularity of information related to the user's account and the UE. The system can also enable the SIM to be updated dynamically based on changes to the user account or other factors.

Overview

As shown in FIG. 1, examples of the present disclosure can comprise a system and method for providing additional granularity of control using an existing SIM 100. Most SIMs 100 currently use at most the mobile country code (MCC) 102 and mobile network code (MNC) 104 entries on the SIM 100. The MCC 102 is a three decimal digit value 110 that, as the name implies, indicates the country of origin of the SIM 100 provider. Similarly, the MNC 104 is a two or three decimal digit value 112 that provides the name of the carrier, or network provider, associated with the SIM 100.

Many SIMs 100 nonetheless contain entries for group identifier 1 (GID1) 106 and group identifier 2 (GID2) 108. These entries 106, 108 are not always used. When they are used, they may be used to provide a single piece of information, generally using a 2-byte value 114, 116. So, for example, they may tie a particular SIM 100 to a particular brand within a network, for example.

These entries GID1 106, GID2 108 can be used to provide additional functionality, however, with minimal modification. In the first place, the length of these entries GID1 106, GID2 108 is only defined in the 3GPP specification as being "n-bytes." See, e.g., "3GPP TS 31.102 V8.6.0", 3rd Generation Partnership Project (2009-03) available at www.3gpp.org. As a result, these entries GID1 106, GID2 108 could be configured to contain additional information.

As shown in FIG. 1, however, even using the standard 2-byte value for these fields can provide significant additional functionality by simply parsing the individual bits. So, for example, a 2-byte value for GID2 108 can provide several additional values 118-126 to provide additional control and information to a UE via the SIM 100. In addition, because GID1 106 and GID2 108 are generally intended to be updated periodically, these settings can also be updated using SIM over-the-air (OTA) messages, for example. This provides the ability to update the SIM 100 and thus, the functionality of the UE, dynamically.

The subdivision of the bits for GID2 108, for example, can be based on the values 118, 120, 122, 124, 126. Value A 118 can comprise six bits, for example, and can be used to denote a field that requires slightly more information. Value A could be used to denote a rate plan, for example, or a particular brand. Thus, Value A 118 can be used to differentiate between the aforementioned $100 unlimited plan and the $20 lower cost plan.

Value B 120, on the other hand, can be used to denote a binary field. Value B 120 could be "0" if the SIM 100 is for use with a prepaid plan (or UE), for example, and "1" if the SIM 100 is for use with a postpaid plan. In this manner, a user cannot "move sideways" from prepaid to postpaid accounts, as discussed above. Value B 120 could also be used to denote a particular brand, for example, where a carrier only has two brands.

In order to provide this additional functionality, the SIM 100 can be programmed to contain one or more values 118-126 using the GID1 106 entry, GID2 108 entry, or both. In some examples, this additional programming can be hardcoded at the time the SIM 100 is manufactured. In other cases, the additional programming can be done when the SIM 100 is sold. In other words, a salesperson or technician at the phone retailer, for example, can add the necessary information to the SIM 100 using a SIM card writer, or similar device. In still other embodiments, as discussed below, the SIMs 100 can also be programmed initially and/or updated during use using a secure SIM OTA platform, for example, or other methods to update SIMs.

Of course, the additional values on the SIM 100 have to be recognized in some way to be of use. In some examples, therefore the UE can be programmed to detect and use one or more additional values 118-126. As discussed below, therefore, if a prepaid SIM 100 is inserted in a postpaid UE, for example, the UE can compare a value in the UE SIMLock configuration to the value (e.g., value 118) from the SIM 100 to determine that the prepaid SIM 100 is incompatible with the postpaid UE. The UE can then provide an error message, for example, limit functionality, or power off, among other things. As discussed below, the ability of the UE to compare the one or more values 118-126 on the SIM 100 to its own configuration can be hard-coded into the UE when it is manufactured, or can be added using various secure methods, such as using a secure trusted execution environment (TEE).

Each of the values 118-126 can be tailored to a specific need. Thus, values 118-126 that require more differentiation can include more bits and vice-versa. In addition, GID1 106, GID2 108, and other SIM 100 entries can be used in this manner to provide exceptional granularity. Thus, the particular layout shown in FIG. 1 is entirely illustrative. The allocation of bits to each value 118-126 is, therefore, arbitrary and can be changed to suit different configuration. In addition, as mentioned above, the allocation of the bit length for each value and the actual values 118-126 can also be updated dynamically using SIM OTA messages, or other means, to accommodate changing configurations.

Figure 2:
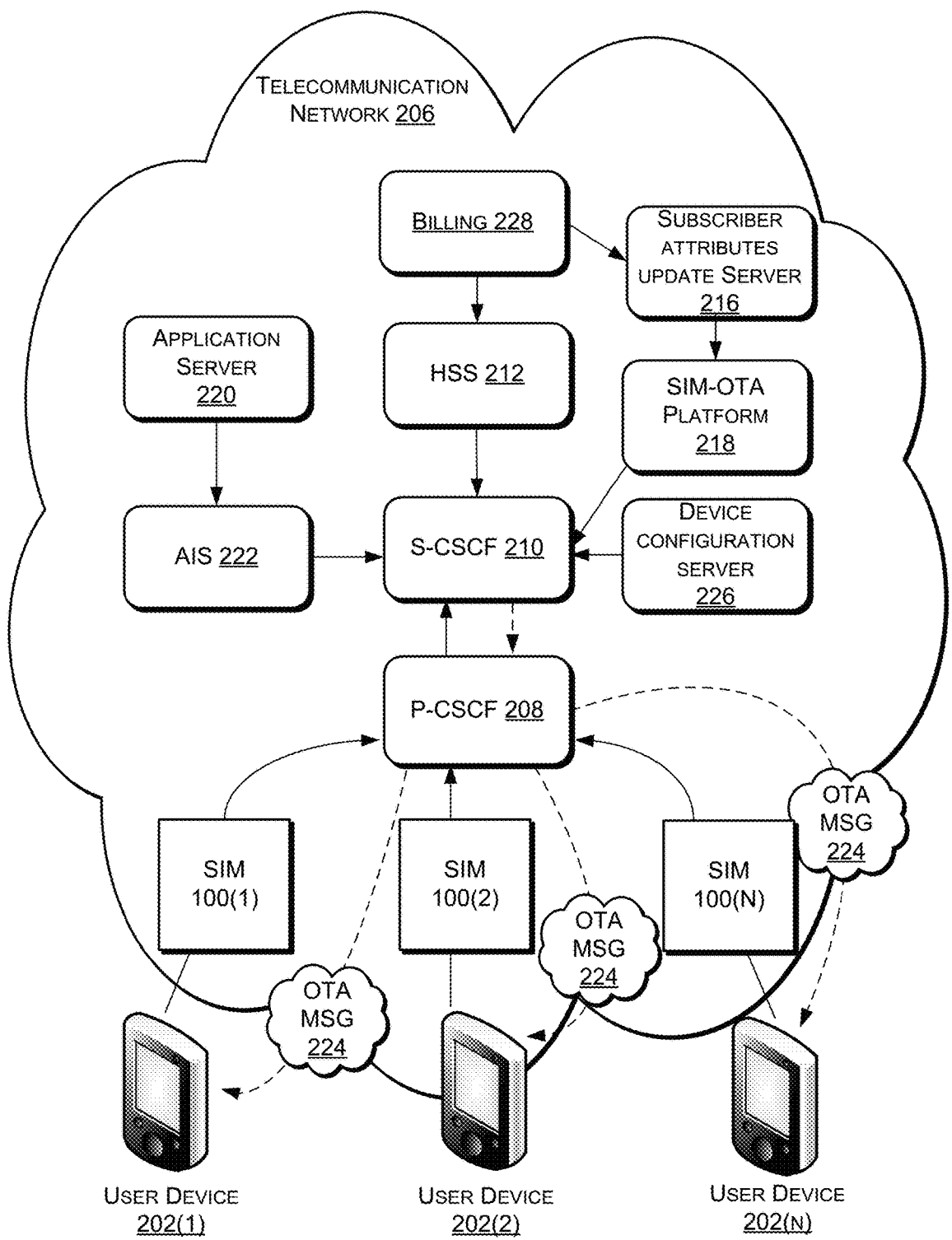
FIG. 2 illustrates an overview and example environment, including a system in which SIMs receive over-the-air (OTA) message from a subscriber attributes update server and a device configuration server, in accordance with some examples of the present disclosure.

FIG. 2 illustrates an overview and example environment, including UEs 202 communicating via a SIM 100 with a telecommunications network 206. The SIM 100 may include identifying information for the user and the UE 202, including, among other things, the integrated circuit card identifier (ICCID), international mobile subscriber identity (IMSI) number, and its related key. This information can be used to identify and authenticate the UE 202 and SIM 100 on cellular voice and data networks, such as the telecommunications network 206.

As discussed above, the SIM 100 can also include additional information in the GID1 106, GID2 108, and other locations. The UEs 202 can use this information to ensure that various features on the SIM 100 are compatible with the UE 202. If, for example, a "postpaid" SIM 100 is inserted into a "prepaid" UE 202, the UE 202 or the telecommunications network 206 can take appropriate actions (e.g., disable the UE 202).

As illustrated, UEs 202, such as UE 202(1), UE 202(2) and UE 202(N), can initiate communications with the telecommunications network 206 via SIMs 100, such as SIM 100(1), SIM 100(2), through SIM 100(N). Calls and data can be routed to the UEs 202 via one or more telecommunications devices such as a Proxy Call Session Control Function (P-CSCF) 208 and/or a Serving Call Session Control Function (S-CSCF) 210. The P-CSCF 208 and S-CSCF 210 can receive and routed messages and calls to each of the UEs 202 based on service account information, network identities, contact addresses, and other information. The telecommunication network 206 may also include a home subscriber server (HSS) 212, which may be configured to store and provide the network identities and/or contact addresses associated with a service account associated with the UEs 202.

In various implementations, the UEs 202 may be any sort of computing device or computing devices, such as cellular phones, tablet computers, laptop computers, wearable computers, media players, personal computers (PCs), workstations, or any other sort of device or devices. Different UEs 202 may be different types of UEs 202. UE 202(1) may be a cellular phone (e.g., a smart phone), for example, UE 202(2) may be a tablet computer, and UE 202(N) may be a laptop computer. An example UE 202 is described in detail below with reference to FIG. 5.

The system can also include a subscriber attributes update server 216, device configuration server 226, and a SIM-OTA platform 218. The subscriber attributes update server 216 can maintain a database of configurations for each SIM 100, and can provide initial, or updated configurations to the SIMs 100 via the SIM-OTA platform 218, or other suitable SIM update platform. The SIM-OTA platform 218 can provide secure messages to the SIMs 100, as necessary, to update their configurations.

The device configuration server 226, on the other hand, can update configurations for each UE 202 (or, UE SIMLock configuration 300, discussed below), and/or each type of UE 202. Thus, when a user has reached the end of their contract, for example, it may be necessary to update the configuration for both the UE 202 and the SIM 100. The device configuration server 226 can be separate from, or combined with, the subscriber attributes update server 216.

In some examples, the SIMs 100 may be configured at initial power-up of the UE 202, for example, by the subscriber attributes update server 216 via the SIM-OTA platform 218, or other SIM update mechanism. Thus, as the UE 202 powers on, the UE 202 can request the SIM configuration from the subscriber attributes update server 216 via the SIM-OTA platform 218. In other examples, the SIMs 100 can be programmed at the time of manufacture or the time of sale, prior to entering service. The SIMs 100 can be permanently programmed and write-protected or can be updatable using the SIM-OTA platform 218, a SIM card reader, or other methods.

In some examples, the subscriber attributes update server 216 can be a "back-end" entity (or network entity) that receives notifications from other network systems, such as a billing system server 228, about subscriber changes. Thus, if a user reaches the end of their contract, for example, the billing system 228 can inform the subscriber attributes update server 216 that the status of the SIM 100 can be updated accordingly (e.g., removing any prepaid or postpaid restriction). The subscriber attributes update server 216 can then consolidate changes and push them to update the SIM 100 using a suitable SIM update mechanism (e.g., the SIM OTA platform 218).

In some examples, UE SIMLock configuration 300 (discussed below) can be hardcoded (pre-flashed) from the factory. The UE SIMLock configuration 300 can also be dynamically updated using suitable methods, such as a secure trusted execution environment (TEE) and OTA messaging, for example. See, e.g., U.S. patent application Ser. No. 15/084,853, entitled, "Secure Adaptive Device Locking", filed Mar. 30, 2016, which is incorporated by reference herein in its entirety. In some examples, the UE 202 can compose a message to the device configuration server 226 requesting the UE SIMLock configuration 300. In some examples, the device configuration server 226 can provide rule and parameter values, such as values 118, 120, 122, 124, 126, that need to be assigned to a particular UE 202 IMEI. Using these separate channels, the UE 202 and SIM 100 updates can be independent from each other, though this is not required.

The device configuration server 226 can compose a response message for the UE 202, including what values 118-126 (collectively, the UE SIMLock configuration 300) should be included on the UE 202. The UE SIMLock configuration values 326, which can be represented collectively by the UE SIMLock configuration 300, provide values and settings for comparison with settings related to subscriber account, or the SIM configuration 350. The UE SIMLock configuration 300 determines which settings will be checked for compatibility in the SIM configuration 350. The UE 202, an application on the UE 202, the subscriber attributes update server 216, or the configuration server 226, for example, can check to ensure a compatible SIM 100 is installed when the UE 202 is powered up, periodically during use, or at other appropriate times.

The UE SIMLock configuration 300 can include settings for the network, brand, prepaid options, billing rate plans, and other variables. As discussed below, if the SIM configuration 350 does not match the configuration 300 on the UE SIMLock configuration 300, then the UE 202 can be rendered inoperable for voice calls, data usage, or all functions. In some examples, the user may be provided with a message indicating the mismatch and suggesting a possible solution. This configuration can prevent the use of prepaid phones with postpaid SIMs 100, for example, or users from dropping from a high priced plan to a low priced plan on a UE 202 sold for use only with higher priced rate plans, among other things.

In further implementations, the telecommunication network 206 may be any sort of telecommunication network or networks associated with a telecommunication service provider. Such a telecommunication network 206 may include a core network and multiple access networks associated with multiple locations. The access networks may include cellular networks—utilizing Long Term Evolution (LTE), Global System for Mobility (GSM), or other cellular technology—and other networks (e.g., Wi-Fi) utilizing unlicensed spectrum. The access networks can also include airborne Wi-Fi and cellular networks such as, for example, Gogo in-flight services.

The core network may support packet-switched or circuit-switched connections and may include a number of network components. Such components may include a home location register (HLR) or HSS 212 for storing user and device information, as well as IMS components, such as the P-CSCF 208 and S-CSCF 210. The components may also include application server(s) 220, such as a telephony application server (TAS) or rich communication service (RCS) server. Further, the telecommunication network 206 may include an account information server (AIS) 222, which may provide network identities, contact addresses, credentials, and other information to the UE 202.

Figure 6:
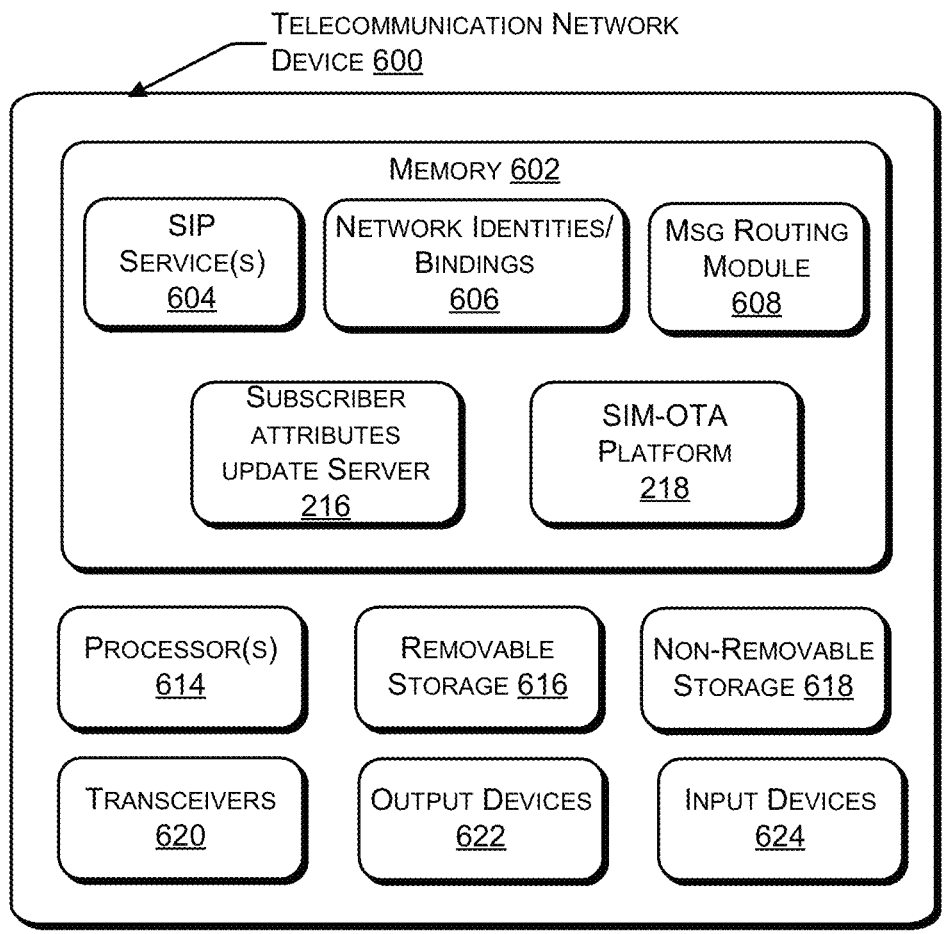
FIG. 6 illustrates a component level view of a telecommunication network device to provide configurations to UE(s), in accordance with some examples of the present disclosure.

Any of the telecommunication network devices, such as the P-CSCF 208, S-CSCF 210, application server(s) 220, HSS 212, or account information server 222, may be implemented on one or more computing devices. In addition, the telecommunication network devices, such as the P-CSCF 208 and S-CSCF 210 may be implemented on a single computing device. Such computing devices may each be or include a server or server farm, multiple, distributed server farms, a mainframe, a work station, a PC, a laptop computer, a tablet computer, an embedded system, or any other sort of device or devices. In one implementation, the computing device(s) represent a plurality of computing devices working in communication, such as a cloud-computing network of nodes. An example telecommunication network device 500—which could be used to implement the P-CSCF 208, S-CSCF 210, or application server 220—is illustrated in FIG. 6 and is described in detail below with reference to that figure.

To provide additional functionality, the UEs 202 can also be programmed to decipher the additional information provided by the SIMs 100. In other words, the additional information provided in the GID1 entry 106, GID2 entry 108, or other entries is of little use if the UE 202 (or the telecommunications network 206) is not configured to parse it and apply it. To this end, as shown in FIG. 3A, in some examples, the UE 202 can be configured with a UE SIMLock configuration 300 that includes one or more of the additional values 118-126 found on the SIM 100.

As shown in FIGS. 3A and 3B, therefore, examples of the present disclosure can comprise a system and method for providing additional granularity to the management of UEs 202. As shown, the system can utilize existing UE elementary files (EFs) 300 (FIG. 3A) and a SIM EFs 350 (FIG. 3B) in a more efficient manner to provide additional controls and granularity. Generally, the EF "group identification 1" (GID1), if it is used at all, is currently used only to "network lock" a UE 202. In this manner, a UE 202 with a GID1 value associated with a particular carrier can only be used with a SIM 100 from that carrier. Currently, group identification 2 (GID2) is generally not used at all.

Embodiments of the present disclosure can comprise a system for not only using these additional fields (e.g., GID1 106 and GID2 108), but for using them more effectively. Thus, as shown in FIG. 3A, the UE SIMLock configuration 300 can comprise, for example, the standard MCC 102 and MNC 104 fields and their associated values 110, 112 denoting the country code value 110 and carrier code value 112 for the UE 202. In addition, however, the UE SIMLock configuration 300 can also comprise a GID1 entry 106 and one or more values 118-126 parsed from this entry.

As discussed above, these values can be parsed using the bits from a standard two-byte value for GID1 106 (or GID2 108). The length of each UE SIMLock configuration values 326 can be based on the amount of information required for that particular UE SIMLock configuration values 326. So, for example, binary values (i.e., there are only two choices) can use as little as one byte—0 for yes, and 1 for no, or vice-versa. More complicated entries, on the other hand, such as rate plan or account type, for example, may use more bytes, as necessary.

To be compatible, therefore, both the UE SIMLock configuration 300 and SIM configuration 350 can include the same, or similar, entries 102-108. Each configuration 300, can include one or more entries 102-108 and one or more values 110-126 associated with each entry 102-108. As discussed below, each entry 102-108 can be stand-alone or can be part of a logic tree, or other logical scheme.

The configurations 300, 350 can include entries for country 102, network 104, GID1 106, GID2 108 (not shown), and other entries. Of course, more or less entries 102-108 than those shown could be used and are contemplated herein. In some examples, the entries 102-108 can comprise two-byte binary categories consistent with third generation partnership project (3GPP) standards. In some examples, each entry 102-108 can also include one or more values 110-126. In some cases, each value 110-126 can comprise binary or alphanumeric codes related to the parameters for each UE 202 and/or SIM 100.

The MNC 104, for example, can include a code, name, number, or other value denoting the carrier associated with the UE 202 or the SIM 100. In some examples, the MNC 104 can be used to designate a single carrier. In other examples, the MNC 104 can be used to designate a parent company associated with multiple carriers. As discussed below, the brand value 120 can further delineate carriers or companies within a single carrier, if appropriate.

In some examples, the configurations 300, 350 can include a rate plan group value 118. This can designate the rate plan associated with the UE 202 and prevent users from switching rate plans after obtaining a UE 202. This can prevent users from receiving a UE 202 at a deep discount based on a more expensive rate plan, for example, and then switching to a less expensive rate plan. In some cases, the rate plan value 118 can remain in place for the life of the UE 202. In other examples, the rate plan value 118 can remain in place for the life of the contract (e.g., two years), for example, and may only be updated after the contract expires. Of course, this is true of the other values 110-126 based on similar factors.

In other cases, the rate plan value 118 may change after the user buys a predetermined number of prepaid minutes, for example. As discussed below, when a user has fulfilled one or more contractual obligations, the rate plan value 118 and other values 118-126 can be updated using several methods including SIM-OTA messages 224 from the telecommunications network 206 (e.g., via the SIM-OTA platform 218).

The brand value 120 can include multiple brands associated with the same MNC 104. A single carrier may have a brand associated with U.S. sales, for example, a separate brand associated with international sales, and yet another brand specifically for prepaid accounts. Thus, if only the MNC 104 is indicated on the configurations 300, then the SIM 100 of any brand associated with that carrier can be used. If, on the other hand, both network and brand are designated in the UE configuration 300, then only a SIM 100 associated with both the same network and the same brand will operate. This can prevent the aforementioned sideways movement from a prepaid brand to a postpaid brand within the same carrier or company, for example, or from a premium brand to a discount brand (or vice-versa).

The configurations 300, 350 can also include a prepaid vs. postpaid value 122. As the name implies, this can enable the UE 202 to be designated for use with prepaid customers only, postpaid customers only, or both prepaid and postpaid customers. This may be useful for a carrier that has both prepaid and postpaid accounts on the same network or within the same brand. This can specifically prevent the sideways movement between prepaid and postpaid accounts discussed above. For carriers with suitable business models, however, this can also enable user to move freely between prepaid and postpaid, as desired. This can be achieved by not setting the prepaid value 122 in the UE configuration 300, setting the prepaid value 122 to "both" in the UE configuration 300, or updating the prepaid value 122 in the SIM configuration 350 when the customer has satisfied any initial contractual obligation (e.g., their contract expires).

The configurations 300, 350 can also include an account type value 124. The account type value 124 can be used to differentiate between business and personal accounts, for example. The account type value 124 can also be used to designate government accounts, for example, or accounts with large corporate customers. The account type value 124 could be used to restrict international calls on government or corporate accounts, for example, or to indicate accounts with voice calling only and no data, among other things.

The configurations 300, 350 can also include additional values, or parameters 126. These additional values 126 can include information related to region, voice vs. data, roaming, or any other parameters that the carrier wished to control. A particular UE 202 may be authorized for use only in a particular region (e.g., the Southeast U.S.) or a particular country (e.g., Spain, but not the remainder of the EU). A UE 202 used for a delivery business, for example, may be authorized for voice calls only and not data (or vice-versa). This value 126 may also be used to block roaming calls and/or data for a calling plan that does not include roaming, for example.

The configurations 300, 350 enable the customization of the UE 202, the SIM 100, or both. In this manner, the UE 202 can be prevented from unauthorized use. The UE 202, an application on the UE 202, or the telecommunications network 206 can be configured to read and parse this additional information from the SIM 100. The UE 202 can then compare settings from the UE SIMLock configuration 300 to those of a SIM configuration 350 to determine if the SIM 100 can be used with the UE 202 or not As discussed above, at the time of manufacture, during start-up, or periodically during use, the UE 202 can communicate with the subscriber attributes update server 216 to request settings related to the user's account to be updated on the SIM 100 (i.e., in the SIM configuration 350). In some examples, the SIM 100 can be programmed with the necessary information at the time of manufacture or the time of sale. In other examples, the settings can be provided to the SIM 100 using a secure OTA message 224 from the SIM-OTA platform 218. Providing secure OTA messages 224 can also enable settings to be changed on the SIM 100 securely and remotely when in order to reflect the current status of the subscriber account. Thus, if a user's contract has expired, for example, the UE SIMLock configuration 300 can be updated to remove the prepaid/postpaid value 122. In this configuration, the user is now free to use the UE 202 under either regime reflected on the SIM 100.

Similarly, the UE 202 can be configured at the time of manufactured (e.g., hardcoded), at the time of sale, or remotely using various secure techniques. In some examples, the UE 202 can be programmed at the time of sale at the retailer, for example. In other examples, the UE 202 can include a secure application, for example, to store the UE SIMLock configuration 300 and compare the UE SIMLock configuration 300 to the SIM configuration 350 to determine compatibility. In some examples, as discussed above, the UE SIMLock configuration 300 can be updated dynamically using a secure TEE and secure messaging with the telecommunications network 206.

As shown in FIGS. 4A-4F, the system, which can comprise an application on the UE 202, for example, or on the telecommunications network 206, can compare SIM configuration 350 the UE SIMLock configuration 300 to determine if the SIM 100 is compatible with the UE 202. This can be performed by the UE 202, by an application running on the UE 202, or by a component of the telecommunications network 206. In some examples, the entries 102-108 can form a "logic tree" of increasing granularity. Thus, a fewer number of values 118-122 may be required by the UE 202 than are actually contained on the SIM 100. If only the network category 104 is chosen in the UE SIMLock configuration 300, for example, then only a matching network value 112 in the SIM configuration 350 is required.

Figure 4A:
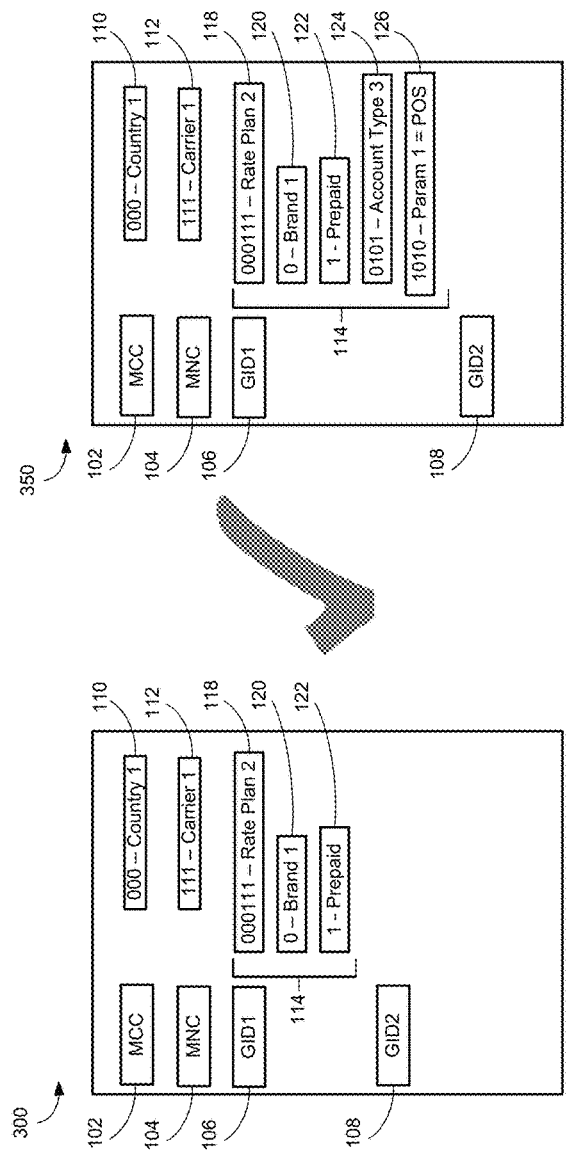

As shown in FIG. 4A, for example, the UE SIMLock configuration 300 contains values for MCC 110, MNC 112, rate plan value 118, brand 120 and prepaid 122. The SIM configuration 300, on the other hand, contains these values 110, 112, 118, 120, 122, but also includes values for account type 124 and parameter 1 126. In this case, however, because the UE SIMLock configuration 300 only requires the first five values 110-122 and because the SIM configuration 350 contains matching values 110-122, the remaining values 124, 126 in the SIM configuration 350 are irrelevant and are simply ignored. Thus, the configurations 300, 350 shown in FIG. 4A are compatible and the UE 202 can be activated (e.g., to the extent of the user's subscription).

Similarly, as shown in FIG. 4B, the UE SIMLock configuration 300 can form a hierarchy that is required of the SIM configuration 350. In this case, the UE SIMLock configuration 300 requires specific values for MCC 110, MNC 112, rate plan value 118, brand 120, and prepaid status 122. The SIM configuration 350, however, does not contain a value for the prepaid status 122. As a result, the system determines that the UE 202 and SIM 100 are not compatible.

Figure 4C:
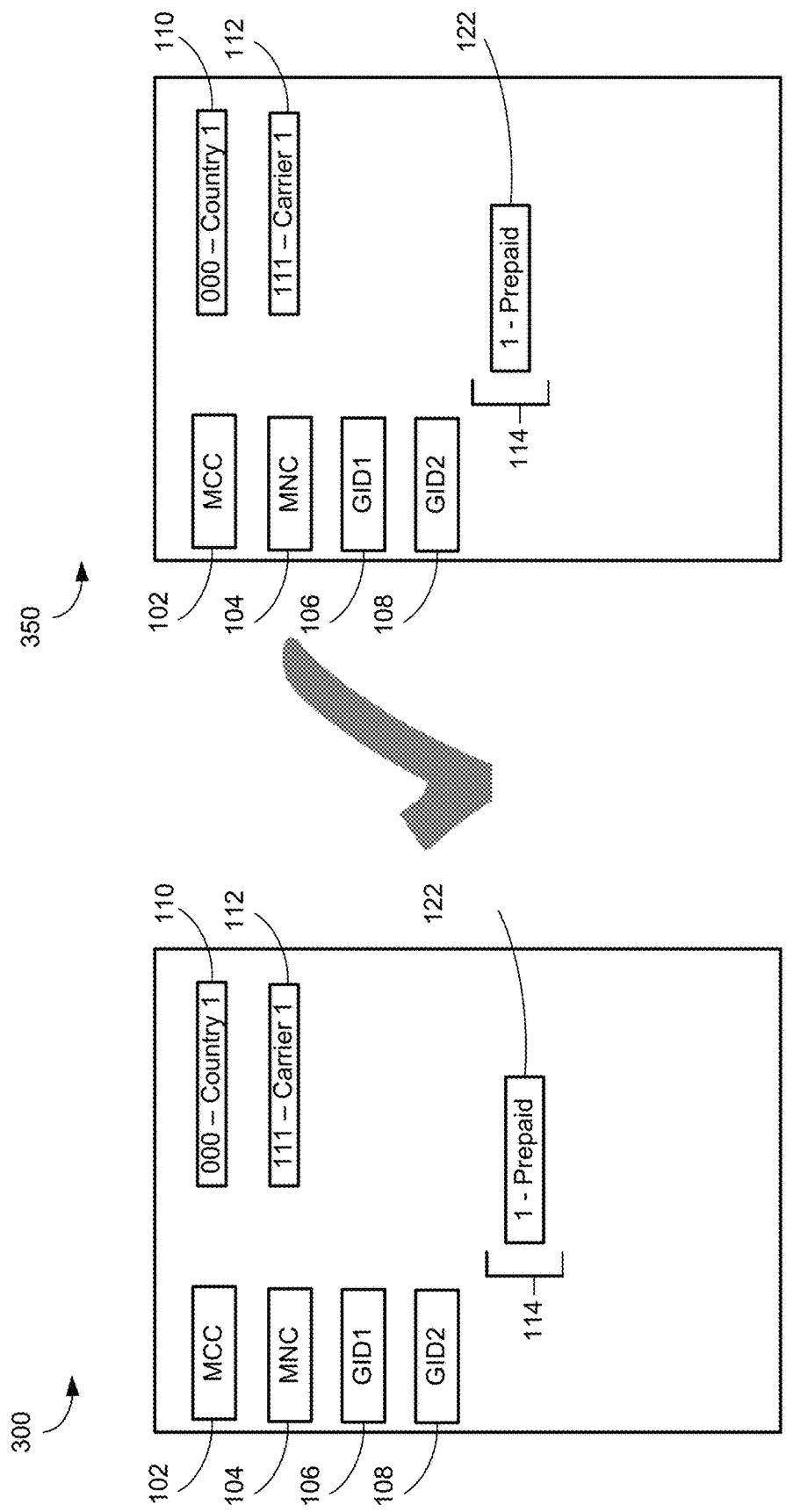

As shown in FIG. 4C, in some cases, the UE SIMLock configuration 300 and the SIM configuration 350 can simply be compared value-by-value with no inherent hierarchy. In other words, as shown, both the UE SIMLock configuration 300 and the SIM configuration contain values for MCC 110, MNC 112, and prepaid 122. In addition, the UE SIMLock configuration 300 and the SIM configuration 350 have matching values 110, 112, 122 for these entries. Thus, despite the fact that no rate plan value 118 is provided, for example, the UE SIMLock configuration 300 and the SIM configuration 350 are nonetheless compatible.

In FIG. 4D the UE SIMLock configuration 300 and the SIM configuration 350 have compatible values for MCC 110, MNC 112, and postpaid/prepaid 122. As shown, however, the UE SIMLock configuration 300 requires a rate plan value 118 for "rate plan 2," while the SIM configuration 350 contains a rate plan value 118 for "rate plan 5." Thus, UE SIMLock configuration 300 may require at least the second most expensive rate plan 112, for example, but the SIM configuration 350 contains the fifth most expensive rate plan 118. As a result, the UE SIMLock configuration 300 and the SIM configuration 350 are found to be incompatible.

This can be caused by the user changing the rate plan online after purchasing the UE 202, for example, or buying a different SIM 100 after purchasing the UE 202 at the higher initial rate plan (i.e., rate plan 2). In this case, the user is prevented from using the UE 202 with the cheaper rate plan, however, protecting the carrier from a potential loss. The user can then update the SIM 100 to include the higher rate plan value 118 (e.g., using the SIM-OTA platform 218), or use the SIM 100 in its current configuration in a different, but compatible UE 202 (e.g., an unlocked UE 202 or one purchased at a lower discount).

Of course, in some cases, the UE SIMLock configuration 300 may have a lower rate plan value 118 than the SIM configuration 350, indicating a lower requirement. As a result, in some cases, comparison of two values may be a logical operation rather than a Boolean operation. In other words, the comparison of the two rate plan values 118 may simply ensure that the rate value 118 in the SIM configuration 350 is "equal to or greater than" the rate value 118 in the UE SIMLock configuration 300. Thus, if the UE SIMLock configuration 300 requires a rate plan value 118 representing a monthly plan of at least $40/mo. and the SIM configuration 350 has a $100/mo. the rate value 188, the UE 202 and the SIM 100 can be determined to be compatible.

As discussed above, and shown in FIGS. 4E and 4F, rather than being linked in any way, each entry 102, 104, 106 and value 110-126 in the UE SIMLock configuration 300 can simply require a compatible entry 102, 104, 106 and value 110-126 in the SIM configuration 350. In other words, each value 110-126 in the UE SIMLock configuration 300 can be compared one-to-one with the respective value 110-126 in the SIM configuration 350. If the values 110-126 are found to be compatible, then the UE 202 can be activated, regardless of any hierarchical configuration. If, on the other hand, any of the values 110-126 are either incompatible or missing (i.e., present in the UE SIMLock configuration 300 and not in the SIM configuration 350), then the UE 202 and SIM 100 are determined to be incompatible.

Figure 4E:
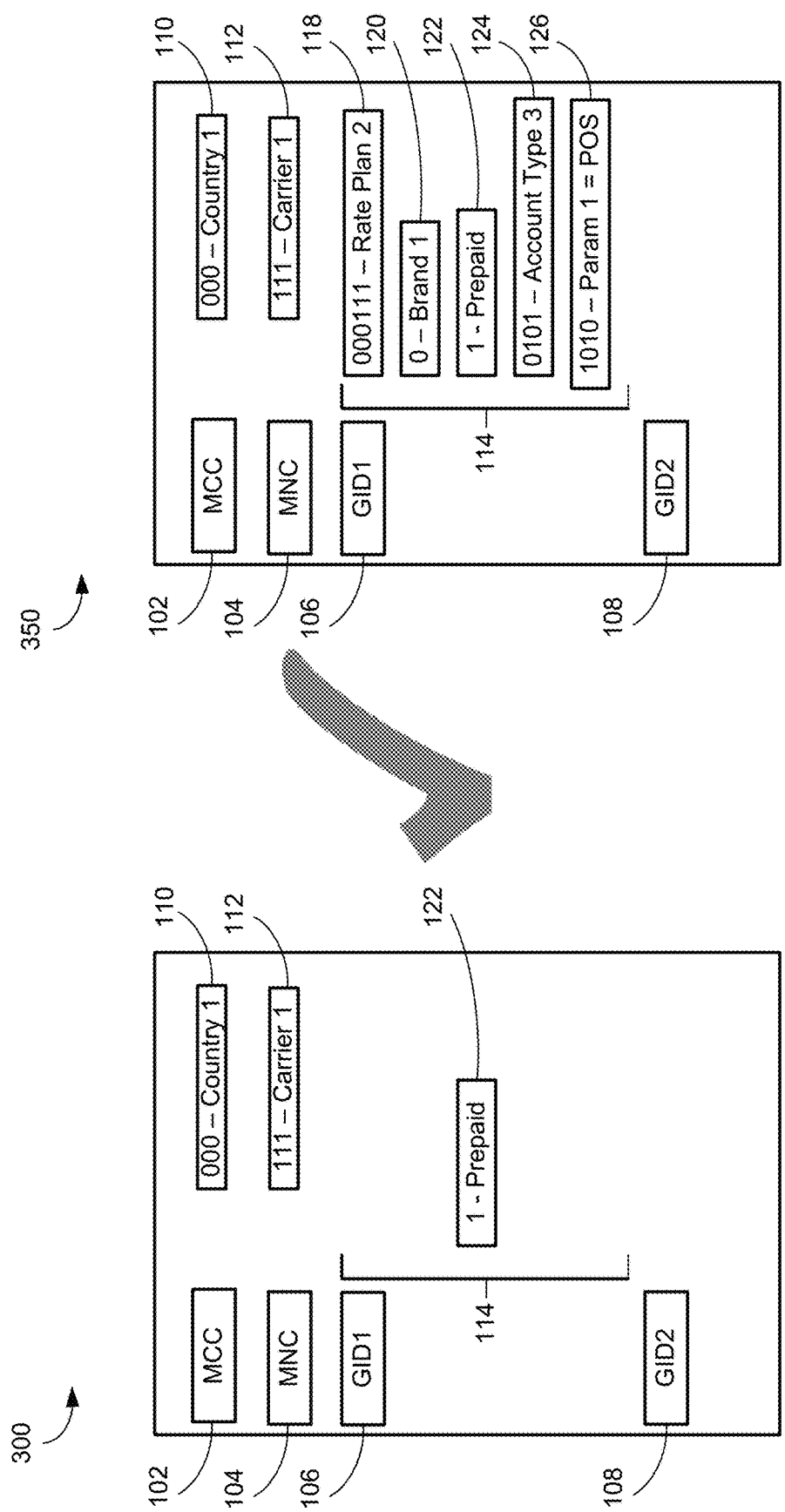

Thus, as shown in FIG. 4E, the UE SIMLock configuration 300 requires only the MCC 102, MNC 104, and part of the GID1 106 entries (the prepaid value 122). And because the SIM configuration contains compatible values for MCC 110, MNC 112, and prepaid/postpaid 122, the configurations 300, 350 are determined to be compatible. In contrast, in FIG. 4F, the UE SIMLock configuration 300 requires an additional value, "Param1" 126, which is not contained in the SIM configuration 350 (i.e., no value is provided). As a result, in FIG. 4F, the SIM 100 is determined to be incompatible with the UE 202.

In response to a determination that the UE 202 and the SIM 100 are incompatible, the system can take a number of actions. In some cases, the UE 202 can display a message informing the user that the UE 202 and SIM 100 are incompatible. In other example, the message can further provide information about what the problem is and how it can be corrected. The message may state, for example, "This phone requires a SIM compatible with prepaid accounts only, please insert a prepaid SIM." A message related to rate plans may state, for example, "This phone requires a minimum monthly rate plan of $40. Please insert a SIM with a $40 rate plan or higher."

In addition to displaying an error message, the UE 202 can also become fully, or partially, inoperable. The UE 202 may be restricted to making only emergency calls, for example—i.e., the phone can only dial 911. In some examples, the UE 202 may automatically power down after displaying the error message. In still other examples, the UE 202 may only be able to dial customer service (to rectify the problem). In yet other examples, the UE 202 may be able to perform one function (e.g., texting), but not another function (e.g., voice calling) because the UE 202 is compatible with respect to the former value on the SIM 100, but not the latter.

In some examples, the UE 202 can take one of these actions based on internal software or applications contained on the UE 202. In other words, if the UE 202 determines that the SIM 100 is incompatible, the UE 202 can disable, power down, etc. In some examples, the severity of the action can vary depending on the type of incompatibility. If the UE 202 is network-locked and a SIM 100 from a competing network is inserted, for example, the UE 202 may simply power down. If, on the other hand, an incompatible SIM 100 (e.g., prepaid vs. postpaid) from the same carrier is inserted, the UE 202 may enable calling to the carrier's customer service only.

In other examples, the UE 202 can send a secure message to the telecommunications network 206 reporting the incompatibility. In some examples, the message can include the nature of the incompatibility, identifying information for the UE 202, and identifying information for the SIM 100. The telecommunications network 206 can then determine an appropriate action based on the incompatibility and send a return message to the UE 202 with further instructions. In some examples, the action taken by the UE 202 can vary based on the nature of the incompatibility. In some examples, an incompatibility detected by the UE 202 may not actually be an incompatibility and no action is necessary (e.g., the rate plan on the SIM 100 is higher than the rate plan on the UE 202).

Example Devices

Figure 5:
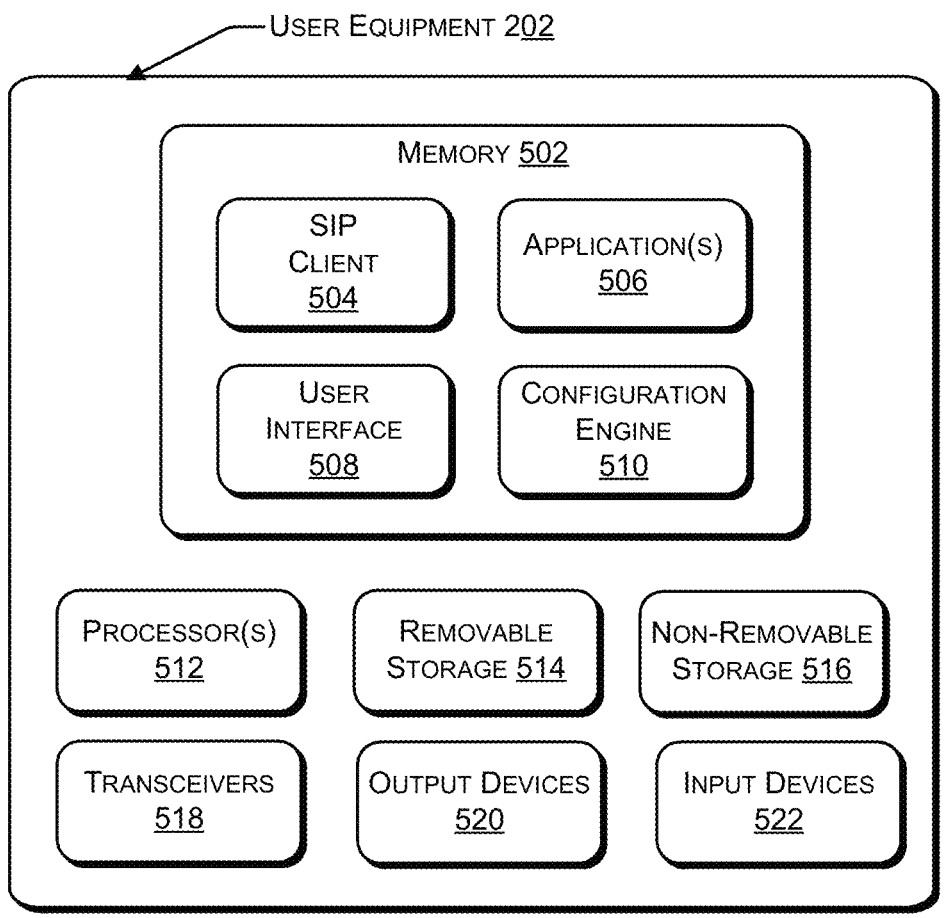
FIG. 5 illustrates a component level view of an example UE for use with the system, in accordance with some examples of the present disclosure.

FIG. 5 illustrates a component level view of an example UE 202 including provisions for the UE SIMLock configuration 300 discussed above. As illustrated, the UE 202 can comprise a system memory 502 storing a SIP client 504, application(s) 506, a user interface 508, and a configuration engine 510. Also, the UE 202 includes processor(s) 512, a removable storage 514, a non-removable storage 516, transceivers 518, output device(s) 520, and input device(s) 522.

In various implementations, system memory 502 is volatile (such as RAM), non-volatile (such as ROM, flash memory, etc.), or some combination of the two. The SIP client 504 may perform any or all of the receiving of network identities, contact addresses, and other functions related to identifying the UE 202 to the telecommunications network 206. The application(s) 506 can include various common applications (e.g., navigation, text messaging, web browsers, etc.). The UE 202 can also include a user interface 508, such as a graphical user interface (GUI) configured to receive user input and generate user preferences.

The UE 202 can also comprise a configuration engine 510. As the name implies, the configuration engine 510 can receive, store, and update UE SIMLock configuration 300 information. Thus, in some examples, the initial configuration can be hardcoded into the UE 202 via the configuration engine 510 during manufacture. In other examples, the configuration engine 510 can retrieve the initial configuration from the telecommunications network 206, for example, when the UE 202 is first powered up. As mentioned above, this may be done in a TEE environment prior to booting the main OS, for example, and can use secure messaging between the UE 202 and the telecommunications network 206.

In some examples, the configuration engine 510 can also be responsible for comparing the UE SIMLock configuration 300 to the SIM configuration 350 to determine compatibility, and take appropriate action based on the comparison. In other examples, the configuration engine 510 can securely communicate with the telecommunications network 206 to perform the comparison. The configuration engine 510 can be implemented as hardware, software, or a combination thereof.

In some examples, the configuration engine 510 can comprise an application running on the UE 202. The configuration engine 510 may run in a secure TEE, for example, that is separate from the rich operating system (OS) of the UE 202. In other examples, the configuration engine 510 can be implemented as hardware on the UE 202. The configuration engine 510 can comprise a data structure including the UE SIMLock configuration 300, though the structure may be different than that shown herein.

In some implementations, the processor(s) 512 is a central processing unit (CPU), a graphics processing unit (GPU), or both CPU and GPU, or any other sort of processing unit. The UE 202 may also include additional data storage devices (removable and/or non-removable) such as, for example, magnetic disks, optical disks, or tape. Such additional storage is illustrated in FIG. 5 by removable storage 514 and non-removable storage 516.

Non-transitory computer-readable media may include volatile and nonvolatile, removable and non-removable tangible, physical media implemented in technology for storage of information, such as computer readable instructions, data structures, program modules, or other data. System memory 502, removable storage 514, and non-removable storage 516 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the UE 202. Any such non-transitory computer-readable media may be part of the UE 202.

In some implementations, the transceivers 518 include any sort of transceivers known in the art. For example, transceivers 518 may include a radio transceiver that performs the function of transmitting and receiving radio frequency communications via an antenna. The transceivers 518 may facilitate wireless connectivity between the UE 202 and other devices. In addition, the transceivers 518 may also include a wireless communication transceiver and a near field antenna for communicating over unlicensed wireless IP networks, such as local wireless data networks and personal area networks (e.g., Bluetooth or near field communication (NFC) networks). Further, the transceivers 518 may include wired communication components, such as an Ethernet port, that connect the UE 202 in a wired fashion to other devices.

In some implementations, the output devices 520 include any sort of output devices known in the art, such as a display (e.g., a liquid crystal display), speakers, a vibrating mechanism, or a tactile feedback mechanism. Output devices 520 also include ports for one or more peripheral devices, such as headphones, peripheral speakers, or a peripheral display.

In various implementations, input devices 522 include any sort of input devices known in the art. For example, input devices 522 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 6 illustrates a component level view of a telecommunication network device configured to deliver messages and calls to UE(s) 202 and provide configurations, among other things. The telecommunication network device 600 may be an example of a P-CSCF 208, the S-CSCF 210, the subscriber attributes update server 216, the application server 220, or other network device. As illustrated, the telecommunication network device 600 comprises a system memory 602 storing SIP service(s) 604, network identities/bindings 606, and a message routing module 608. The telecommunications network device 600 can also include the aforementioned subscriber attributes update server 216 and SIM-OTA platform 218, though they may also be provided as separate entities. Also, the telecommunications network device 600 can include a processor(s) 614, a removable storage 616, a non-removable storage 618, transceivers 620, output device(s) 622, and input device(s) 624.

In various implementations, system memory 602 is volatile (such as RAM), non-volatile (such as ROM, flash memory, etc.), or some combination of the two. SIP service(s) 604 may perform any of the SIP functions of the telecommunication network 206, including retrieving the network identities and/or contact addresses from the HSS 212 or similar, including, e.g., Sh/Cx interfaces, and providing the network identities and/or contact addresses to the UEs 202. The network identities/bindings 606 may be used by the message routing module 608 to identify contact addresses, network identities, ISDNs and other identifiers. The message routing module 608 can receive messages, identify contact addresses, determine any UEs 202 associated with the contact address in the message, and deliver the message based on that determination.

As discussed above, the system can also include a subscriber attributes update server 216 and a SIM-OTA platform 218 (or any other mechanism configured to update SIM). The subscriber attributes update server 216 can maintain and store the SIM configuration 350 for each SIM 100. The subscriber attributes update server 216 can also receive updates from other telecommunications network 206 components. So, for example, when a user's contract expires, the subscriber attributes update server 216 can receive a message from the billing server 228 to modify the SIM configuration 350 for a particular SIM 100. The subscriber attributes update server 216 can then update the relevant value 110-126 in the SIM configuration 350 and send the update to the SIM 100 via the SIM-OTA platform 218 (or other suitable means).

In some examples, such as when SIMs 100 are not initially programmed, upon powering up, the UE 202 can connect to the telecommunications network 206 and provide the UE's 202 IMEI, the SIM's 100 international mobile subscriber identity (IMSI), and other relevant information. In some examples, the SIM 100 may communicate directly with the SIM-OTA platform 218. The SIM-OTA platform 218 can verify the message and pass the message onto the subscriber attributes update server 216 to retrieve the SIM configuration 350.

In some examples, the subscriber attributes update server 216, which can be a "back-end" entity (or network entity), receives the message. The subscriber attributes update server 216 can then verify the message and retrieve the SIM configuration 350 for that particular SIM 100. The subscriber attributes update server 216 can then pass a message, including the SIM configuration 350 to the SIM-OTA platform 218 for transmission to the UE 202.

Upon receiving the rules and parameters from the subscriber attributes update server 216, the SIM-OTA platform 218 can compose a response message for the SIM 100, including what entries 102-108 should be part of the SIM configuration 350 and an initial value 110-126 for each parameter. The SIM configuration 350 can provide values and settings for rules to be compared to the UE SIMLock configuration 300. The SIM 100 must then satisfy these rules for the UE 202 to operate. The UE 202 can check to ensure a compatible SIM 100 is installed at power up, periodically during use, or at other appropriate times.

In some implementations, the processor(s) 614 is a central processing unit (CPU), a graphics processing unit (GPU), or both CPU and GPU, or any other sort of processing unit. The telecommunication network device 600 may also include additional data storage devices (removable and/or non-removable) such as, for example, magnetic disks, optical disks, or tape. Such additional storage is illustrated in FIG. 6 by removable storage 616 and non-removable storage 618.

Non-transitory computer-readable media may include volatile and nonvolatile, removable and non-removable tangible, physical media implemented in technology for storage of information, such as computer readable instructions, data structures, program modules, or other data. System memory 602, removable storage 616, and non-removable storage 618 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the telecommunication network device 600. Any such non-transitory computer-readable media may be part of the telecommunication network device 600.

In some implementations, the transceivers 620 include any sort of transceivers known in the art. For example, the transceivers 620 may include wired communication components, such as an Ethernet port, for communicating with other networked devices. Also or instead, the transceivers 620 may include wireless modem(s) to may facilitate wireless connectivity with other computing devices. Further, the transceivers 620 may include a radio transceiver that performs the function of transmitting and receiving radio frequency communications via an antenna.

In some implementations, the output devices 622 include any sort of output devices known in the art, such as a display (e.g., a liquid crystal display), speakers, a vibrating mechanism, or a tactile feedback mechanism. Output devices 622 also include ports for one or more peripheral devices, such as headphones, peripheral speakers, or a peripheral display.

In various implementations, input devices 624 include any sort of input devices known in the art. For example, input devices 624 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 7:
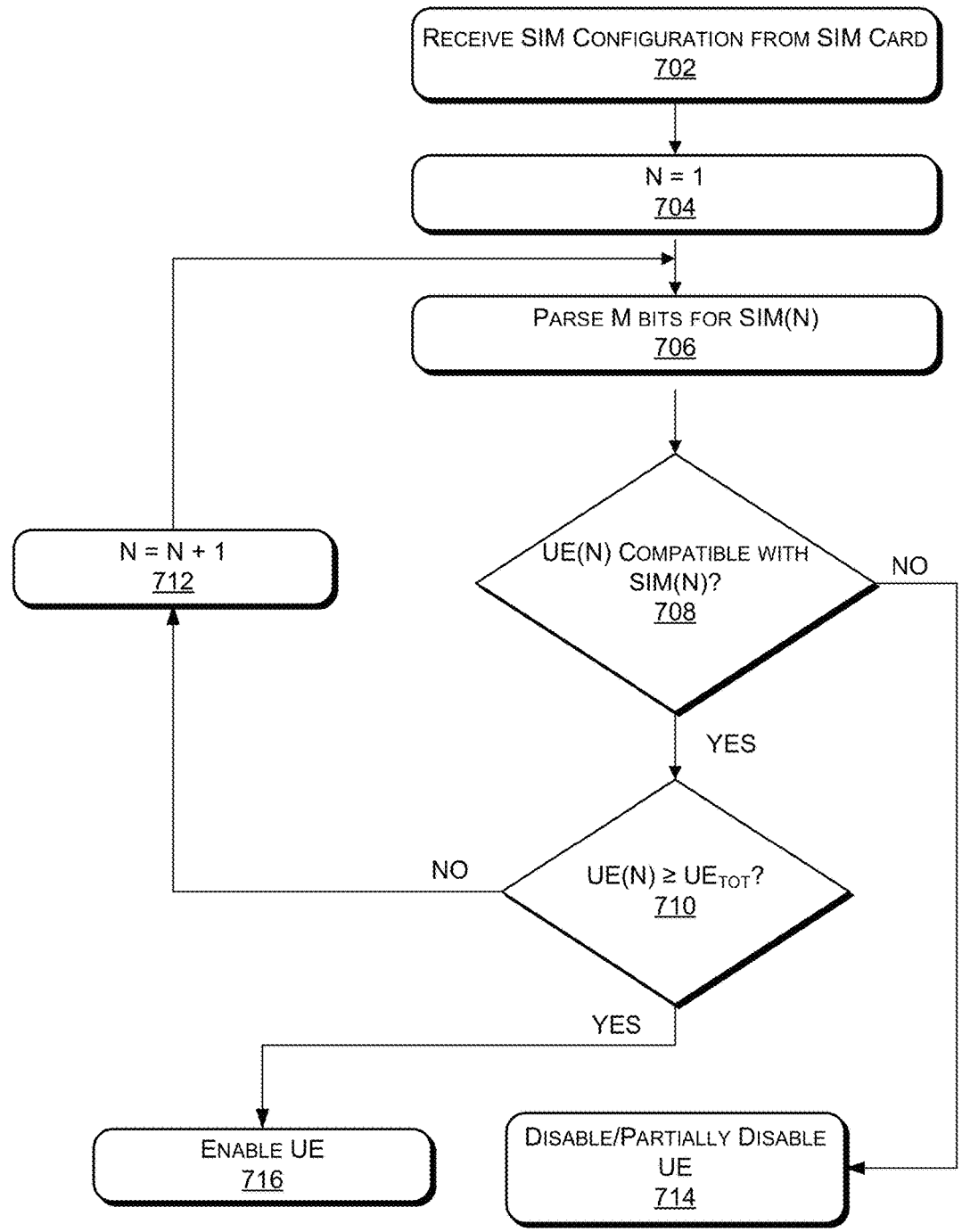
FIG. 7 illustrates an example process for comparing a UE SIMLock configuration to a SIM configuration to determine compatibility, in accordance with some examples of the present disclosure.

FIGS. 7-8 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described should not be construed as a limitation, and any number of the described operations can be combined in any order and/or in parallel to implement the processes.

As shown in FIG. 7, examples of the present disclosure can also comprise a method 700 for determining whether a SIM 100 and a UE 202 are compatible. As discussed below, because the UE SIMLock configuration 300 can contain multiple values 110-126 for a single entry 102-108, the method 700 can include parsing a particular entry 102-108 into its constituent values 110-126.

As discussed above, the UE 202 can include a UE SIMLock configuration 300, which includes one or more entries 102-108 and one or more values 110-126 that are required of a SIM 100 to be used with the UE 202. It should be noted that the data structure used herein for the UE SIMLock configuration 300 and the SIM configuration 350 is purely to ease explanation and is not intended to limit the disclosure to this configuration. Other data structures could be used and are contemplated herein. The UE SIMLock configuration 300 can be a data structure included in the hardware or software of the UE 202. The UE SIMLock configuration 300 can be an application, hardcoded, or otherwise installed on the UE 202. Regardless of form, the UE SIMLock configuration 300 can be installed on the UE 202, for example, at the time of manufacture, distribution, sale, or using secure OTA messages. In other examples, as discussed above, the UE SIMLock configuration can be implemented in a secure TEE separate from the rich OS to increase security, among other things.

At 702, the UE 202 can read the SIM configuration 350 from a SIM 100 that has been installed in the UE 202. The UE 202 can receive one or more values 110-126 included in one or more entries 102-108 from the SIM configuration 350, as discussed above. At 704, a counter, N, can be set to 1 to begin the check for the first entry UE(1) (e.g., MCC 102) in the UE SIMLock configuration 300 against the first entry SIM(1) in the SIM configuration 350.

At 704, in some examples, based on the structure of the UE SIMLock configuration 300, the application 700 can parse a predetermined number of bits from the current entry (e.g., GID1 106). In some examples, the values for MCC 110 and MNC 112 can be extracted from the international mobile subscriber identity (IMSI) value from the SIM 100. In some examples, such as for undivided entries (e.g., MCC 102 and MNC 104), no parsing may be required. In these cases, the application 700 can merely compare the complete value 110, 112 in the UE SIMLock configuration 300 to the complete value 110, 112 in the SIM configuration 350. For entries 106, 108 that may be divided into multiple values 118-126, the application 700 can parse the entries 106, 108 into the necessary separate values 118-126. Whether a particular entry 102-108 can or should be parsed can be provided by the data structure of the UE SIMLock configuration 300.

So, for example, assuming the UE SIMLock configuration 300 is compatible with the SIM 100 shown in FIG. 1, no parsing is required for the values 110, 112 for MCC 102 and MNC 104. When the application 700 proceeds to GID2 108, one the other hand, the application 700 can parse the various values 118-126 from the single GID2 108 entry. Thus, as shown, the application 700 can initially parse the first six bits 118, then a single bit 120, then another single bit 122, then four bits 124, and finally, the last four bits 126. Of course, as discussed above, this structure is somewhat arbitrary and can be adjusted to meet various data requirements. These values 118-126 can then be compared to the relevant values 118-126 in the UE SIMLock configuration 300 for compatibility.

At 708, the application 700 can compare UE(1) (e.g., MCC 110) in the UE SIMLock configuration 300 to the first value SIM(1) (e.g., MCC 110) in the SIM configuration 350. This comparison can include checking that both configurations 300, 350 have values 110 for that entry 102 and ensuring that the values 110 match (or are compatible). As mentioned above, in some cases, the SIM configuration 350 may include a higher rate plan value 118, for example, than the UE SIMLock configuration 300, yet still be compatible. In other words, the UE SIMLock configuration 300 may require a minimum $40/month rate plan, but the SIM configuration 350 includes a $100/month rate plan. In this case, the rate plan values 118 obviously do not match, but the higher rate plane value 118 in the SIM configuration 350 nonetheless satisfies the minimum rate plan requirement in the UE SIMLock configuration 300.

At 710, the method 700 can determine whether it has checked all of the entries 102-108 and all of the values 110-126 contained in each entry 102-108 in the UE SIMLock configuration 300. In other words, the system checks to see if the current value, UE(N), is greater than or equal to the total number of values, $UE_{TOT}$, used in the UE SIMLock configuration 300. If not, at 712, N is increased by one to continue the comparison process for the next category, UE(2).

At 714, if a value 110-126 from the SIM configuration 350 is determined to be incompatible with the UE SIMLock configuration 300, on the other hand, the process 700 can be terminated. In other examples, depending on the nature of the incompatibility, the remaining values 110-126 can be checked. As discussed above, depending on the nature of the incompatibility, the UE 202 can then be fully, or partially, disabled. In other words, in some examples, all of the values 110-126 must be compatible for the UE 202 and SIM 100 to be compatible. Thus, if the rate plan value 118 is found to be too low—e.g., it is $40/month on the SIM 100 and $100/mo. on the UE 202—the UE 202 can be disabled. Similarly, if a user attempts to place a SIM 100 with a "post-pay" value 122 in a UE 202 intended for pre-pay only, the UE 202 will be disabled.

At 716, if the method 700 has checked all of the values 110-126 for the UE SIMLock configuration 300 and has found no incompatibilities, then the UE 202 can be enabled. As mentioned above, because the method 700 is based on the values 110-126 in the UE SIMLock configuration 300 and not the values 110-126 in the SIM configuration 350, it is immaterial if the SIM configuration 350 includes additional values 110-126 not required by the UE SIMLock configuration 300. See, e.g., FIG. 4A. Thus, the SIM configuration 350 can have "too many" entries and still be compatible, but will be found at least partially incompatible if it has fewer entries than the UE SIMLock configuration 300.

CONCLUSION

While several possible examples are disclosed above, examples of the present disclosure are not so limited. For instance, while various entries 102-108 on the SIM card 100 are discussed for use with the system, other entries on the SIM card 100 could be used and parsed in a similar fashion. In addition, the location and configuration used for various features of examples of the present disclosure such as, for example, the location and configuration of configuration engine 510, the component that actually compares the two configurations 300, 350, and the layout of the telecommunications network 206, for example, can be varied according to a particular network, UE, or location that requires a slight variation due to, for example, size or power constraints, the type of processing required, or regulations related to transmission interference, for example. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
retrieving a plurality of bits from a first entry on a UE SIMLock configuration;
parsing a first group of one or more bits from the plurality of bits;
associating the first group of one or more bits with a first UE SIMLock configuration value;
parsing a second group of one or more bits from the plurality of bits; and
associating the second group of one or more bits with a second UE SIMLock configuration value;
wherein parsing a first group of one or more bits from the plurality of bits comprises parsing a single bit from the plurality of bits;
wherein associating the first group with a first UE SIMLock configuration value comprises associating the first group with a prepaid value;
wherein a digit of 0 or 1 for the first group is associated with a prepaid account; and
wherein the other digit of 0 or 1 is associated with a postpaid account.

2. The method of claim 1, further comprising:
parsing a third group of one or more bits from the plurality of bits; and
associating the third group of one or more bits with a third UE SIMLock configuration value.

3. The method of claim 1, wherein the first entry on the UE SIMLock configuration comprises a group identifier 1 (GID1) entry.

4. The method of claim 1, wherein the first entry on the UE SIMLock configuration comprises a group identifier 2 (GID2) entry.

5. The method of claim 1, wherein parsing a first group of one or more bits from the plurality of bits comprises parsing two or more bits from the plurality of bits; and
wherein associating the first group with a first UE SIMLock configuration value comprises associating the first group with a rate plan for a carrier.

6. A method comprising:
retrieving, with a configuration engine of a UE, a plurality of bits from a first entry on a subscriber identity module (SIM) installed in the UE;
parsing, with the configuration engine, a first group of one or more bits from the plurality of bits;
associating, with the configuration engine, the first group of one or more bits with a first value in a SIM configuration;
parsing, with the configuration engine, a second group of one or more bits from the plurality of bits;
associating, with the configuration engine, the second group of one or more bits with a second value in the SIM configuration; and
comparing the SIM configuration to a UE SIMLock configuration to determine if the UE and the SIM are compatible;
wherein the SIM configuration comprises a first number of values;
wherein the UE SIMLock configuration comprises a second number of values; and
wherein, if the first number is smaller than the second number the UE and the SIM are determined to be incompatible.

7. The method of claim 6, further comprising:
parsing, with the configuration engine, a third group of one or more bits from the plurality of bits;
associating, with the configuration engine, the third group of one or more bits with a third value in a SIM configuration;
parsing, with the configuration engine, a fourth group of one or more bits from the plurality of bits; and
associating, with the configuration engine, the fourth group of one or more bits with a fourth value in the SIM configuration.

8. The method of claim 6, wherein the first entry on the SIM comprises one of a group identifier 1 (GID1) entry or a group identifier 2 (GID2) entry.

9. The method of claim 6, where comparing the SIM configuration to a UE SIMLock configuration to determine if the UE and the SIM are compatible comprises:
comparing a first value of the UE SIMLock configuration to the first value in the SIM configuration; and
comparing a second value in the UE SIMLock configuration to the second value in the SIM configuration.

10. The method of claim 6, further comprising:
parsing, with the configuration engine, a third group of one or more bits from the plurality of bits; and
associating, with the configuration engine, the third group of one or more bits with a third value in a SIM configuration;
wherein the UE SIMLock configuration comprises a first value and a second value; and
wherein comparing the SIM configuration to the UE SIMLock configuration to determine if the UE and the SIM are compatible comprises comparing the first value and the second value in the UE SIMLock configuration to the first value and the second value in the SIM configuration and disregarding the third value in the SIM configuration.

11. The method of claim 6, wherein the first value of the SIM configuration comprises a rate plan value;
wherein comparing the SIM configuration to the UE SIMLock configuration to determine if the UE and the SIM are compatible comprises comparing the rate plan value in the SIM configuration to a rate plan value in the UE SIMLock configuration; and
wherein the SIM and the UE are determined to be compatible when the rate plan value in the SIM configuration is greater than or equal to a rate plan value in the UE SIMLock configuration.

12. A method comprising:
retrieving a plurality of bits from a first entry on a UE SIMLock configuration;
parsing a first group of one or more bits from the plurality of bits;
associating the first group of one or more bits with a first UE SIMLock configuration value;
parsing a second group of one or more bits from the plurality of bits; and
associating the second group of one or more bits with a second UE SIMLock configuration value;
wherein parsing a first group of one or more bits from the plurality of bits comprises parsing a single bit from the plurality of bits;
wherein associating the first group with a first UE SIMLock configuration value comprises associating the first group with a brand for a carrier;
wherein a digit of 0 or 1 for the first group is associated with a first brand; and
wherein the other digit of 0 or 1 is associated with a second brand.

13. The method of claim 12, further comprising:
parsing a third group of one or more bits from the plurality of bits; and
associating the third group of one or more bits with a third UE SIMLock configuration value.

14. The method of claim 12, wherein the first entry on the UE SIMLock configuration comprises a group identifier 1 (GID1) entry.

15. The method of claim 12, wherein the first entry on the UE SIMLock configuration comprises a group identifier 2 (GID2) entry.

16. The method of claim 12, wherein parsing a first group of one or more bits from the plurality of bits comprises parsing two or more bits from the plurality of bits; and
wherein associating the first group with a first UE SIMLock configuration value comprises associating the first group with a rate plan for a carrier.

* * * * *